(12) United States Patent
Li et al.

(10) Patent No.: US 10,833,964 B2
(45) Date of Patent: Nov. 10, 2020

(54) VISUAL ANALYTICAL METHOD AND SYSTEM FOR NETWORK SYSTEM STRUCTURE AND NETWORK COMMUNICATION MODE

(71) Applicant: SHENZHEN INSTITUTES OF ADVANCED TECHNOLOGY CHINESE ACADEMY OF SCIENCES, Shenzhen (CN)

(72) Inventors: Wenchao Li, Shenzhen (CN); Jiehong Liu, Shenzhen (CN); Hui Huang, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 16/490,609

(22) PCT Filed: Mar. 13, 2017

(86) PCT No.: PCT/CN2017/076450
§ 371 (c)(1),
(2) Date: Sep. 3, 2019

(87) PCT Pub. No.: WO2018/165823
PCT Pub. Date: Sep. 20, 2018

(65) Prior Publication Data
US 2020/0028763 A1 Jan. 23, 2020

(51) Int. Cl.
*H04L 12/26* (2006.01)
*H04L 12/24* (2006.01)

(52) U.S. Cl.
CPC ............ *H04L 43/045* (2013.01); *H04L 41/12* (2013.01); *H04L 41/145* (2013.01); *H04L 41/22* (2013.01)

(58) Field of Classification Search
CPC ..... H04L 43/045; H04L 41/12; H04L 41/145; H04L 41/22
See application file for complete search history.

(56) References Cited

U.S. PATENT DOCUMENTS

| 7,047,423 B1 * | 5/2006 | Maloney | H04L 43/045 345/473 |
| 7,389,462 B1 * | 6/2008 | Wang | H04L 1/188 714/748 |

(Continued)

FOREIGN PATENT DOCUMENTS

| CN | 101990003 A | 3/2011 |
| CN | 103428015 A | 12/2013 |

(Continued)

OTHER PUBLICATIONS

International Search Report issued in corresponding international application No. PCT/CN2017/076450, dated Dec. 25, 2017.

(Continued)

*Primary Examiner* — Arvin Eskandarnia

(57) ABSTRACT

The present disclosure provides a visual analytical method for a network system structure and a network communication mode including following steps: pre-processing network traffic flow log data; dividing and analyzing network nodes by utilizing a visualization technology according to the pre-processed data, and combining a user interaction to determine server nodes and client nodes in the network nodes; performing a visual analysis on traffic flow and an access situation of the server nodes to determine a server function category according to the determined server nodes; and presenting and analyzing the network communication mode through the visualization technology according to the determined server nodes, the client nodes and the server function category. The present disclosure further provides a (Continued)

visual analytical system for the network system structure and the network communication mode.

10 Claims, 6 Drawing Sheets

(56) References Cited

U.S. PATENT DOCUMENTS

| | | | | |
|---|---|---|---|---|
| 9,250,759 | B1* | 2/2016 | Commons | G06F 16/9535 |
| 10,705,695 | B1* | 7/2020 | Porath | G06F 16/2428 |
| 10,762,097 | B1* | 9/2020 | Porath | G06T 11/206 |
| 2003/0091165 | A1* | 5/2003 | Bearden | H04L 41/22 |
| | | | | 379/88.08 |
| 2005/0195747 | A1* | 9/2005 | Stamps | G06Q 10/06 |
| | | | | 370/241 |
| 2010/0281388 | A1* | 11/2010 | Kane | H04L 43/0894 |
| | | | | 715/736 |
| 2012/0113815 | A1* | 5/2012 | Zhang | H04L 41/12 |
| | | | | 370/242 |
| 2013/0091270 | A1* | 4/2013 | Zhang | G06Q 30/02 |
| | | | | 709/224 |
| 2015/0120856 | A1* | 4/2015 | Bennett | H04L 41/145 |
| | | | | 709/213 |
| 2015/0120959 | A1* | 4/2015 | Bennett | H04L 47/10 |
| | | | | 709/233 |
| 2016/0359872 | A1* | 12/2016 | Yadav | H04L 43/0894 |
| 2016/0359878 | A1* | 12/2016 | Prasad | G06F 21/53 |
| 2016/0359880 | A1* | 12/2016 | Pang | H04L 63/06 |
| 2016/0373312 | A1* | 12/2016 | El-Nasr | A63F 13/20 |
| 2017/0098318 | A1* | 4/2017 | Iannaccone | G06T 11/206 |
| 2017/0200125 | A1* | 7/2017 | Wang | G06F 40/295 |
| 2018/0232753 | A1* | 8/2018 | Billau | G06Q 30/0205 |

FOREIGN PATENT DOCUMENTS

| | | |
|---|---|---|
| CN | 104935570 A | 9/2015 |
| CN | 105450434 A | 3/2016 |
| CN | 106130806 A | 11/2016 |
| CN | 106941419 A | 7/2017 |

OTHER PUBLICATIONS

Written Opinion of the International Searching Authority for No. PCT/CN2017/076450.

* cited by examiner

VISUAL ANALYTICAL METHOD AND SYSTEM FOR NETWORK SYSTEM STRUCTURE AND NETWORK COMMUNICATION MODE

TECHNICAL FIELD

The present disclosure relates to a visual analytical method and system for a network system structure and a network communication mode.

BACKGROUND

Current network traffic flow log data is generally in the form of pure text. Analysis of the network traffic flow log data is generally done by a specially-assigned person, where only some simple statistical operations are performed and more deep-level analysis cannot be performed. In addition, with continuous accumulation of network traffic flow logs, query of the network traffic flow logs becomes difficult, sorting and analyzing the network traffic flow log is along with unreasonable shortcomings like high cost and long time, which is not capable to meet a concept and development trend of a current "big data age".

The network traffic flow logs are typical network data, which has characteristics of typical network, multi-dimensional, and time sequence characteristics. Based on such observations, how to efficiently express the network traffic flow logs is key in solving analysis of a network communication mode.

With continuous enhancement of computing resources and an explosion of data resources, visualization technology is rapidly developed and popularized, and data visualization plays more and more important roles in the big data age. If the network traffic flow logs in a pure text form are processed with visualization, shortcomings of data expressions including not being intuitive, tedious, and being not able perform deep-level analysis, may be overcome.

However, there is no method or system of performing a visual analysis on a network system structure and a network communication mode through the network traffic flow logs in the prior art.

SUMMARY

In view of above, it is necessary to provide a visual analytical method and system for a network system structure and a network communication mode, which is capable to perform a visual analysis on the network system structure and the network communication mode by utilizing network traffic flow logs.

The present disclosure provides a visual analytical method for the network system structure and the network communication mode including following steps:
  a. pre-processing network traffic flow log data;
  b. dividing and analyzing network nodes by utilizing a visualization technology according to the pre-processed data, combining user interaction to determine server nodes and client nodes in the network nodes;
  c. performing a visual analysis on traffic flow and an access situation of the server nodes to determine a server function category according to the determined server nodes; and
  d. presenting and analyzing the network communication mode through the visualization technology according to the determined server nodes, the client nodes and the server function category.

Furthermore, the step a specifically includes: sorting access times, of each node of an internal network, from network traffic flow logs, and sorting total uploaded traffic flow by each node from the network traffic flow logs when the internal network nodes are accessed; respectively selecting nodes ranked higher in accessed times and nodes ranked higher in total access uploaded traffic flow as server candidate nodes; performing an integration and a grouping of IP segments on other nodes accessing the server candidate nodes in the internal network.

Furthermore, the step b is of presenting and analyzing a topological structure of the internal network nodes by using a visualization method of combining chord diagrams and bubble graphs.

Furthermore, the step c specifically includes: visually analyzing characteristics of different servers from time, functions and characteristics of traffic flow; and counting and visualizing access times and uploaded traffic flow of server nodes selected by users in different time periods and different protocols according to server nodes selected by the users.

Furthermore, the step d specifically includes: comparing a communication mode of clients with the communication mode of the servers by using a visualization manner of a pie diagram matrix; and obtaining a protocol specific gravity used by communication traffic flow between clients and clients, clients and servers, servers and servers according to the pie diagram matrix, so that a conventional communication mode of the internal network is obtained.

The present disclosure further provides a visual analytical system for the network system structure and the network communication mode including a pre-processing module, a network node dividing and analyzing module, a server function category analytical module, and a network communication mode analytical module. The pre-processing module is configured to pre-process the network traffic flow log data. The network node dividing and analyzing module is configured to divide and analyze the network nodes by utilizing the visualization technology according to the pre-processed data, and the network node dividing and analyzing module combines the user interaction to determine the server nodes and the client nodes in the network nodes. The server function category analytical module is configured to perform the visual analysis on traffic flow and the access situation of the server nodes to determine the server function category according to the determined server nodes. The network communication mode analytical module is configured to further present and analyze the network communication mode through the visualization technology according to the determined server nodes, client nodes and the server function category.

Furthermore, the pre-processing module is specifically configured to sort the access times, of each node of the internal network, from the network traffic flow logs, sort the total uploaded traffic flow by each node from the network traffic flow logs when the internal network nodes are accessed, select the nodes which access times and access total uploaded traffic flow ranked higher as the server candidate nodes, and perform an integration and a grouping of IP segments on other nodes accessing the server candidate nodes in the internal network.

Furthermore, the network node dividing and analyzing module is configured to present and analyze the topological structure of the internal network nodes by using the visualization method of combining the chord diagrams and the bubble graphs.

Furthermore, the server function category analytical module is specifically configured to visually analyze the characteristics of different servers from the time, the functions and the characteristics of the traffic flow. According to the server nodes selected by the users, the access times and the uploaded traffic flow of the server nodes selected by the users in different periods and different protocols are counted and visualized.

Furthermore, the network communication mode analytical module is specifically configured to compare the communication mode of the clients and the communication mode of the servers by using a visual manner of the pie diagram matrix; according to the pie diagram matrix, the protocol specific gravity used by the communication traffic flow between clients and clients, clients and servers, servers and servers is obtained, so that the routine communication mode of the internal network is obtained.

The present disclosure performs the visual analysis on the network system structure and the network communication mode by utilizing the network traffic flow logs. A classification of the clients and servers is obtained by utilizing an analytical method of "Overview+Detail" combined with various visual methods and interactive technologies such as the chord diagrams and the bubble graphs from the access times and amounted access traffic flow of the network nodes; then according to results of the classification of the clients and servers and different visual methods, the access times and traffic flow characteristics in different time periods and communication protocols are obtained to classify the servers; finally, a normal network communication mode reflected by the data is summarized.

DETAILED DESCRIPTION

In order to make technical problems, technical schemes and beneficial effects solved by the present disclosure clearer, the present disclosure is further described below in detail with reference to the accompanying drawings and embodiments. It should be understood that the specific embodiments described herein are only used to explain the present disclosure and are not intended to limit the present disclosure.

Figure 1:
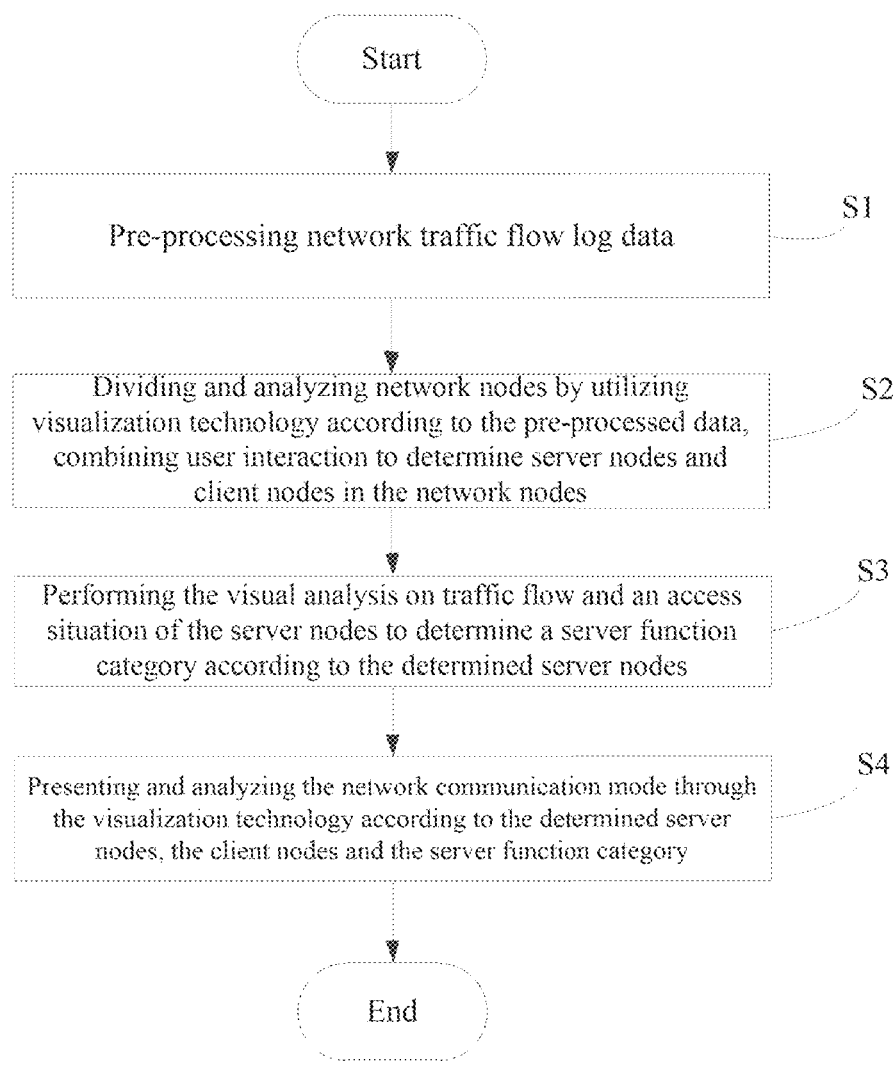
FIG. 1 is a flowchart of a visual analytical method for a network system structure and a network communication mode of the present disclosure.

FIG. 1 is an operating flowchart of a visual analytical method for a network system structure and a network communication mode according one preferred embodiment of the present disclosure.

Step S1 is pre-processing network traffic flow log data, which specifically including following steps:

First, sorting access times, of each node of an internal network, from network traffic flow logs, and sorting total uploaded traffic flow by each node from the network traffic flow logs when the internal network nodes are accessed. Secondly, selecting nodes having access times ranked higher and total uploaded traffic flow ranked higher as server candidate nodes. In the embodiment, the nodes, ranking among the top one hundred access times and top one hundred access total uploaded traffic flow, are selected, and then the nodes are merged to obtain nodes as server candidate nodes. Because the internal network node data is relatively large, in the embodiment, integration and grouping of IP segments are performed on other nodes accessing the server candidate node in the internal network.

Step S2 is dividing and analyzing network nodes by utilizing visualization technology according to the pre-processed data, combining user interaction to determine server nodes and client nodes in the network nodes.

Figure 3:
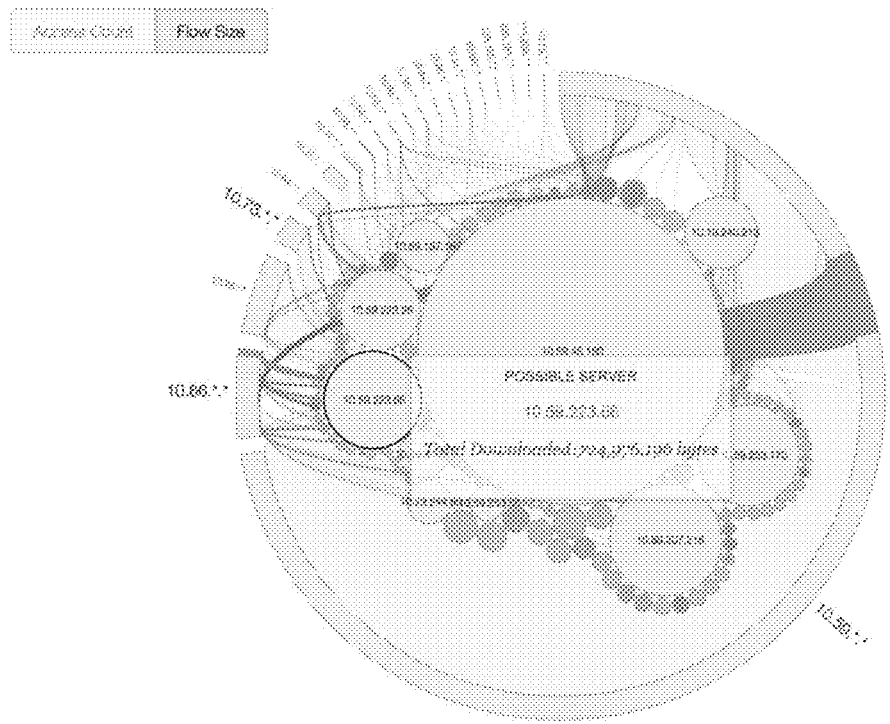
FIG. 3 is a schematic diagram of one embodiment of the present disclosure showing total uploaded traffic flow when main nodes of an internal network are accessed.

In particular, the present embodiment presents and analyzes a topological structure of internal network nodes using a visualization method of combining chord diagrams and bubble graphs to analyze traffic flow relationships and access situations between the client nodes and potential server nodes. In the embodiment, the network nodes are divided, analyzed, and designed to be as shown in FIG. 3. FIG. 3 is a schematic diagram showing total uploaded traffic flow when main nodes of the internal network are accessed. An outer circle of the diagram is composed of the internal network nodes of the different IP segments. A center of the diagram represents the main nodes of the internal network (displaying the nodes which total traffic flow ranked higher). A connecting relationship of each edge represents the access situation from internal nodes of different IP segments to the internal network main nodes, and thickness of the edge represents size of traffic flow.

Figure 4:
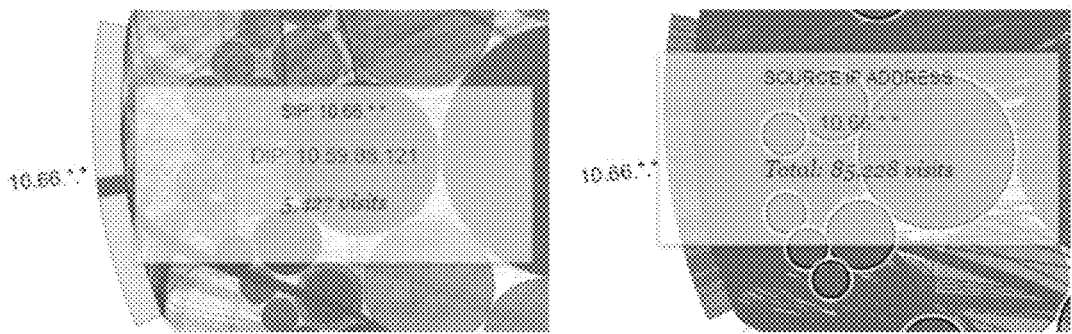
FIG. 4 is a schematic diagram of one embodiment of the present disclosure showing multi-scale prompting information.

In order to realize an analytical method of using "Overview+Detail", the present disclosure provides a plurality of interactive technologies including multi-scale prompting information and interactive filtration (as shown in FIG. 4). The relationships between the clients and the potential servers are visually analyzed by combining the chord diagrams and the bubble graphs. In the analyzing process, the present disclosure designs the multi-scale prompting information in order to understand traffic flow situations between IP and severs of different levels, when a mouse cursor moves over arcs of the chord diagrams, the traffic flow situations between IP segments corresponding to the arcs of the chord diagrams and servers corresponding to mouse positions are shown; and when the mouse cursor moves over names of the IP segments, the traffic flow situations between the IP segment which the mouse cursor moves over and all servers are displayed.

Figure 5:
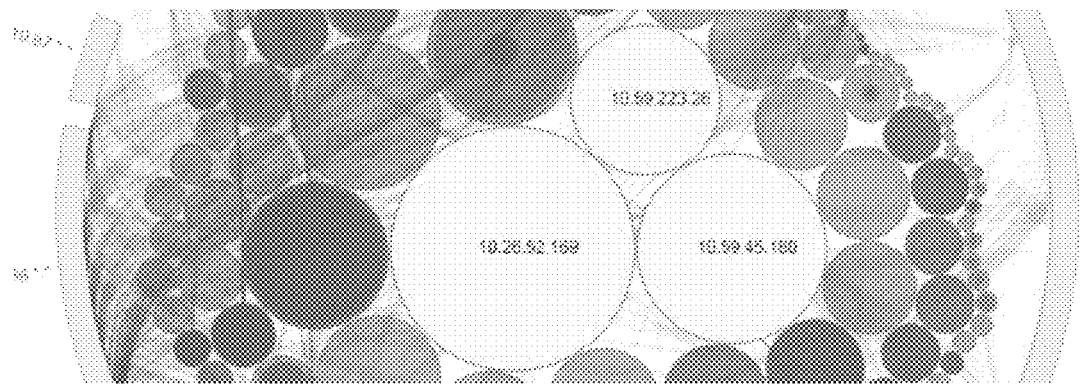
FIG. 5 is a schematic diagram of one embodiment of the present disclosure showing an interactive filtering effect.

In order to find the server nodes from visual graphs composed of the chord diagrams and the bubble graphs, larger nodes in the visual graphs are selected, and a subsequent analysis is performed. In order to support the analysis, users are capable to select one server node which they are interested in by clicking a mouse cursor, and after a circle corresponding to the selected node is selected, a color of the circle is changed, and an IP address of the node corresponding to the circle is displayed (as shown in FIG. 5). After all the server nodes that are of interest to the users are selected, the subsequent analysis is performed for a selected node set.

Step S3 is performing the visual analysis on traffic flow and an access situation of the server nodes to determine a server function category according to the determined server nodes.

Figure 6:
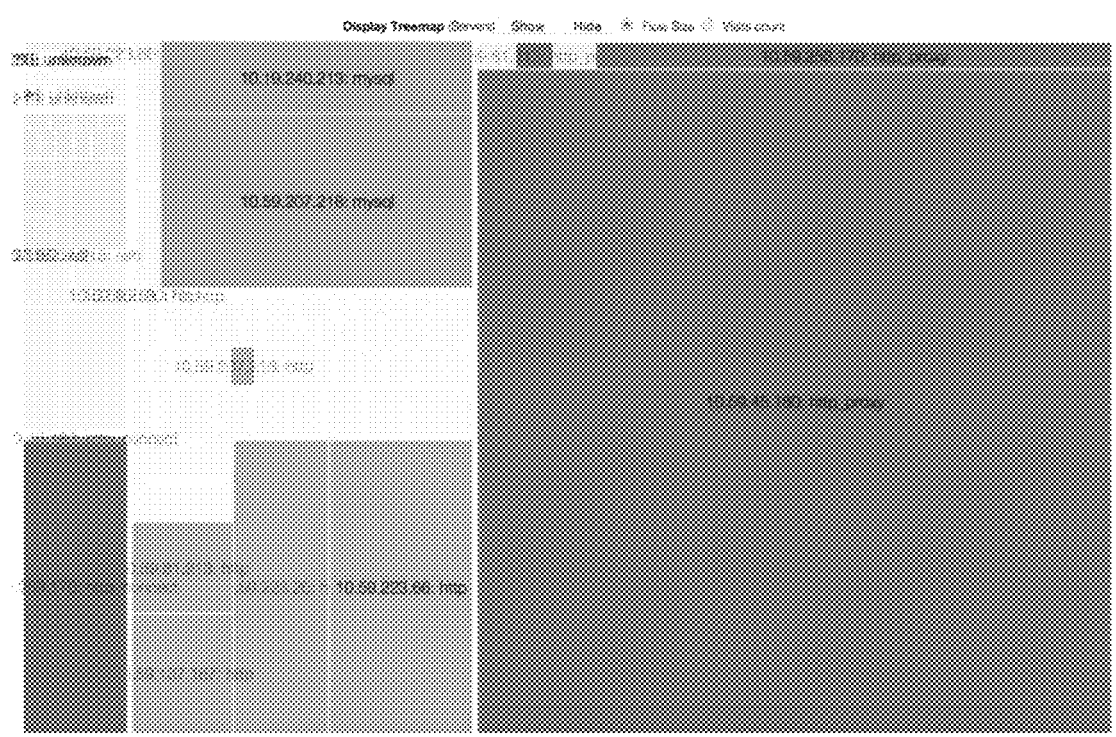
FIG. 6 is a schematic diagram of one embodiment of the present disclosure showing accessed number of times of server nodes on different protocols and uploaded traffic flow when being accessed.

To be specific, the present disclosure mainly visually analyzes characteristics of different servers from time, functions, and characteristics of traffic flow. According to server nodes selected by the users, access times and uploaded traffic flow of the server nodes selected by the users in different time periods and different protocols are counted and visualized. As shown in FIG. 6, the present embodiment uses a manner of a tree diagram to present distribution situations of the uploaded traffic flow (or the access times) in different communication protocols when different server nodes are accessed. A size of rectangular block reflects a size of the uploaded traffic flow (or the access times). The users are capable to classify server functions by the functions of the servers according to the tree diagram.

Figure 7:
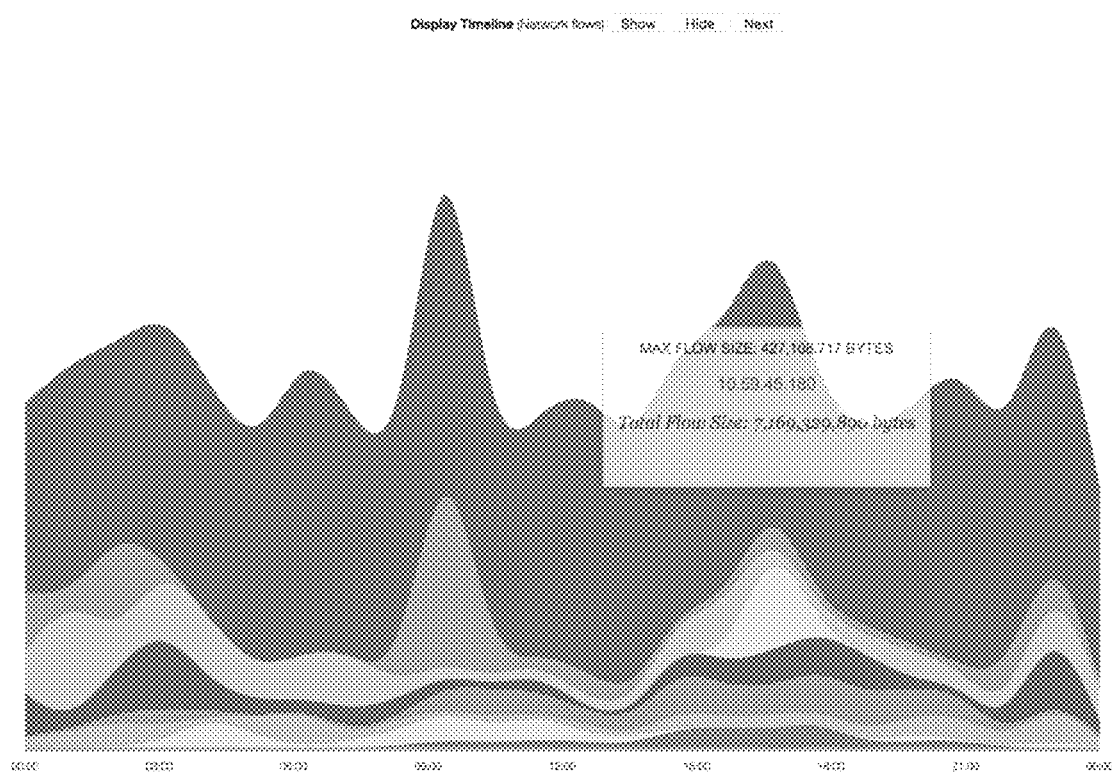
FIG. 7 is a schematic diagram of one embodiment of the present disclosure showing uploaded traffic flow when server nodes are accessed in different time periods.

At the same time, diagrams such as trend diagrams and stacking diagrams are configured to show uploaded traffic flow of different server nodes when the different server nodes are accessed in different time periods within one day. FIG. 7 is a stacking diagram that shows the uploaded traffic flow of the different server nodes when the different server nodes are accessed in different time periods within one day. The users are capable to further illustrate and classify property of the servers according to time characteristics of the uploaded traffic flow of the servers. In one embodiment, servers are classified as all-day working type servers if the servers are with uniformly distributed traffic flow all day, and servers are classified as the servers serving in peak period if the servers are only with distributed traffic flow during a working time period and an off-working time period.

After visualizing data information related to the servers, the users perform a visual analysis according to traffic flow used situation of the servers to classify the server function into categories.

Step S4 is presenting and analyzing the network communication mode through the visualization technology according to the determined server nodes, the client nodes and the server function category.

Figure 8:
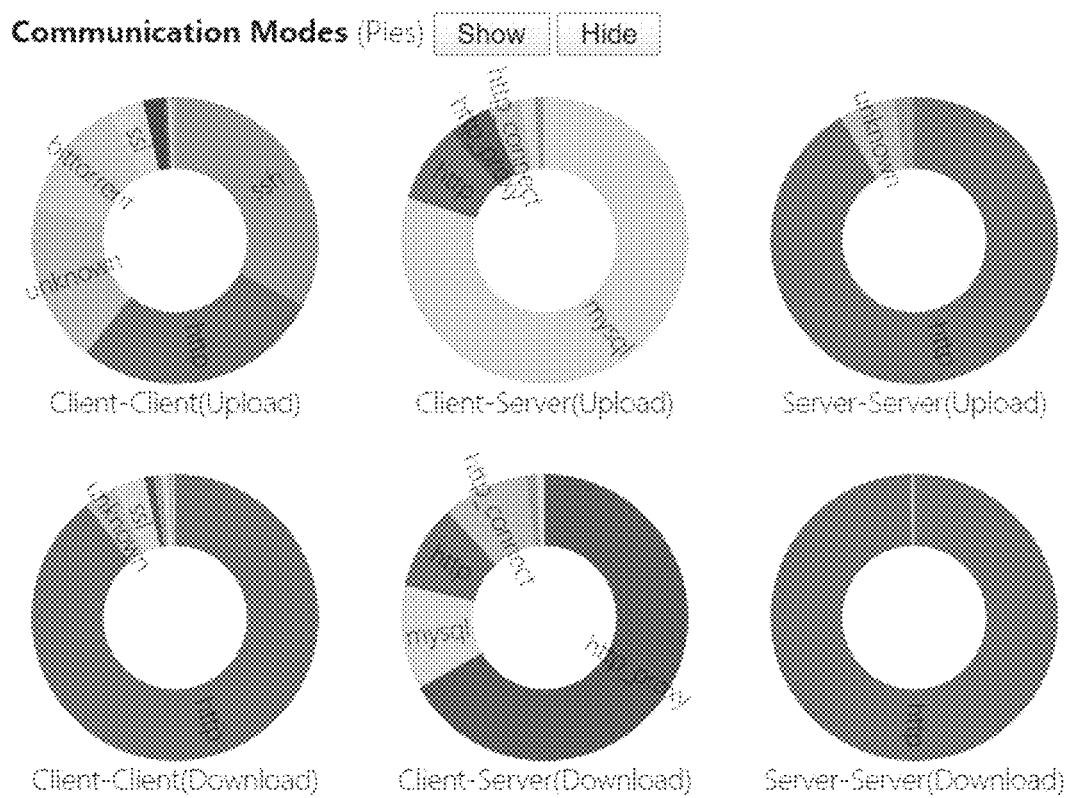
FIG. 8 is a schematic diagram of one embodiment of the present disclosure showing a ratio of traffic flow in different protocols when client to client, client to server, and server to server are uploaded/downloaded.

A visual manner of a pie chart matrix is configured to compare the communication mode of the clients and the communication mode of the servers in the present disclosure. As shown in FIG. 8, six pie diagrams are divided into three columns, the six pie diagrams are traffic flow distribution situations of protocols including a hypertext transfer protocol (http), a secure socket layer protocol (SSL), a bittorrent protocol, a MySQL protocol respectively used by communications among clients to clients, clients to servers, and servers to servers. An upper row and a lower row of the six pie diagrams represent uplink traffic flow and downlink traffic flow.

According to the pie diagram matrix, a protocol specific gravity used by the communication traffic flow between clients and clients, clients and servers, servers and servers is obtained, so that a routine communication mode of the internal network is obtained. For example, a great number of bittorrent protocol traffic flow represent a communication mode of transferred data through bittorrent clients, and an appearance of MySQL protocol traffic flow represents a communication process inquired from servers.

Figure 2:
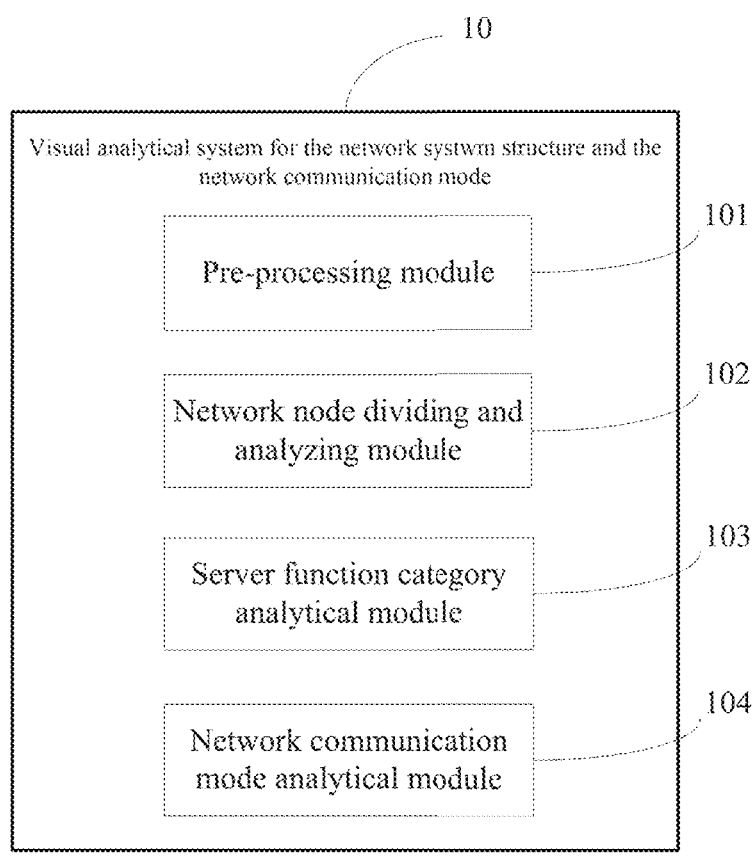
FIG. 2 is a system framework diagram of the visual analytical system for a network system structure and a network communication mode of the present disclosure.

Referring to FIG. 2, FIG. 2 is a system framework diagram of a visual analytical system 10 for the network system structure and the network communication mode of the present disclosure. The visual analytical system includes a pre-processing module 101, a network node dividing and analyzing module 102, a server function category analytical module 103, and a network communication mode analytical module 104.

The pre-processing module 101 is configured to pre-process network traffic flow log data.

To be specific, first, the pre-processing module 101 is configured to sort the access times, of each node of the internal network, from the network traffic flow logs, and sort the total uploaded traffic flow by each node from the network traffic flow logs when the internal network nodes are accessed. Secondly, the pre-processing module 101 is configured to respectively select the nodes which access times and access total uploaded traffic flow ranked higher as the server candidate nodes. In one embodiment, the nodes, ranking among the top one hundred access times and the top one hundred access total uploaded traffic flow, are respectively selected, and then the selected nodes are merged to obtain nodes after merging as the serve candidate nodes. Because the internal network node data is relatively large, an integration and a grouping of IP segments are performed on other nodes accessing the server candidate nodes in the internal network in one embodiment.

The network node dividing and analyzing module 102 is configured to divide and analyze the network nodes by utilizing the visualization technology according to the pre-processed data, and combines the user interaction to determine the server nodes and the client nodes in the network nodes.

To be specific, the present embodiment presents and analyzes the topological structure of the internal network nodes by using the visualization method of combining the chord diagrams and the bubble graphs to analyze the traffic flow relationships and the access situations between the client nodes and the potential server nodes. In one embodiment, the network nodes are divided, analyzed, and designed to be shown in FIG. 3. FIG. 3 is a schematic diagram showing total uploaded traffic flow when main nodes of the internal network are accessed. The outer circle of the diagram is composed of the internal network nodes of the different IP segments. The center of the diagram represents the main nodes of the internal network (displaying the nodes which total traffic flow ranked higher); the connecting relationship of each edge represents the access situation from the internal nodes of different IP segments to the internal network main nodes, and the thickness of the edge represents the size of traffic flow.

In order to realize the analytical method of using "Overview+Detail", the present disclosure provides the plurality of the interactive technologies including multi-scale prompting information and interactive filtration (as shown in FIG. 4). The relationships between the clients and the potential servers are visually analyzed by combining the chord diagrams and the bubble graphs. In the process of analyzing, the present disclosure designs the multi-scale prompting information in order to understand the traffic flow situations between IP and servers of different levels, when the mouse cursor moves over the arcs of the chord diagrams, the traffic flow situations between IP segments corresponding to the arcs of the chord diagrams and the servers corresponding to the mouse cursor positions are shown; and when the mouse cursor moves over names of the IP segments, the traffic flow situations between the IP segment which the mouse cursor moves over and all servers are displayed.

In order to find the server nodes from the visual graphs composed of the chord diagrams and the bubble graph, the larger nodes in the visual graphs are selected, and the subsequent analysis is performed. In order to support the analysis, the users are capable to select one server node which they are interested in by clicking the mouse cursor, after the circle corresponding to the selected node is selected, the color of the circle is changed, and the IP address of the node corresponding to the circle is displayed (as shown in FIG. 5). After all the server nodes that are of interest to the users are selected, the subsequent analysis is performed for the selected node set.

The server function category analytical module 103 is configured to perform the visual analysis on traffic flow and the access situation of the server nodes to determine the server function category according to the determined server nodes.

To be specific, the present disclosure mainly visually analyzes the characteristics of different servers from the time, the functions and the characteristics of the traffic flow. According to the server nodes selected by the users, the access times and the uploaded traffic flow of the server nodes selected by the users in different time periods and different protocols are counted and visualized. As shown in FIG. 6, the present embodiment uses the manner of the tree diagram to present the distribution situations of the uploaded traffic flow (or the access times) in different communication protocols when different server nodes are accessed. The size of rectangular block reflects the size of the uploaded traffic flow (or the access times), the users is capable to classify the server functions by the functions of the servers according to the tree diagram.

At the same time, the diagrams such as the trend diagrams and the stacking diagrams are configured to show the uploaded traffic flow of different server nodes when the different server nodes are accessed in different time periods within one day. FIG. 7 is the stacking diagram showing the uploaded traffic flow of the different server nodes when the different server nodes are accessed in different time periods within one day, the users is capable to further illustrate and classify the property of the servers according to time characteristics of the uploaded traffic flow of the servers. In one embodiment, the servers are classified as the all-day working type servers if the servers have uniformly distributed traffic flow all day, and the servers are classified as the servers serving in peak periods if the servers are only with the distributed traffic flow during the working time period and the off-working time period.

After visualizing the data information related to the servers, the users perform the visual analysis according to the traffic flow used situation of the servers to classify the server function into categories.

The network communication mode analytical module 104 is configured to further present and analyze the network communication mode through the visualization technology according to the determined server nodes, client nodes, and the server function category.

The visual manner of the pie diagram matrix is configured to compare the communication mode of the clients and the communication mode of the servers in the present disclosure. As shown in FIG. 8, the six pie diagrams are divided into three columns, the six pie diagrams are the traffic flow distribution situations of the protocols including the hypertext transfer protocol (http), the secure socket layer protocol (SSL), the bittorrent protocol, the MySQL protocol respectively used by communications among clients to clients, clients to servers, and servers to servers. The upper row and the lower row of the six pie diagrams represent the uplink traffic flow and the downlink traffic flow.

According to the pie diagram matrix, the protocol specific gravity used by the communication traffic flow between clients and clients, clients and servers, servers and servers is obtained, so that the routine communication mode of the internal network is obtained. For example, the great number of bittorrent protocol traffic flow represent the communication mode of transferred the data through the bittorrent clients, and the appearance of MySQL protocol traffic flow represents the communication process inquired from the servers.

The present disclosure provides the visual analytical method and system for the network system structure and the network communication mode based on the network traffic flow log data. Compared with a conventional pure text inquiry analysis method, advantages of the visual analytical method and system for the network system structure and the network communication mode are as follows:

(1) Intuitive data expression. More data content are carried in a smaller space during a process of visually processing a great number of data to make observation of the data more convenient, faster, and more accurate.

(2) High-efficient data analysis. The data and much visual information are integrated through visualization and interaction technology, and information which is potentially expressed by the data is analyzed from multiple aspects, so that effective target data can be mined in huge amounts of data.

(3) Simple and convenient interaction. The present disclosure has good interactivity, and performs the interaction and observation according to the requirements of the users. The present disclosure is not only with a good design function, but also with a more meaningful use process, which is easier to be understood and be accepted by people.

(4) Good adaptability. The method and system of the present disclosure is capable to adapt and process huge date.

Although the present disclosure is described in reference to the preferred embodiments, it should be understood by those skilled in this filed, the above descriptions are only preferred embodiments of the present disclosure, and are not intended to limit the present disclosure, any modification, equivalent replacement and improvement made within the spirit and principle of the present disclosure should be included within the protection scope of the present disclosure.

What is claimed is:

1. A visual analytical method for a network system stricture and a network communication mode, comprising following steps:

a. pre-processing network traffic flow log data;
   b. dividing and analyzing network nodes by utilizing visualization technology according to the pre-processed data, and combining a user interaction to determine server nodes and client nodes in the network nodes;
   c. performing a visual analysis on traffic flow and access situation of the server nodes to determine a server function category according to the determined server nodes;
   d. presenting and analyzing a network communication mode through the visualization technology according to the determined server nodes, the client nodes, and the server function category.

2. The method according to claim 1, wherein the step a comprises:
sorting access times, of each node of an internal network, from network traffic flow logs, and sorting total flow uploaded by the node from network traffic flow logs when the internal network nodes are accessed;
selecting nodes ranked higher in accessed times and nodes ranked higher in total access uploaded traffic flow as server candidate nodes; and
performing integration and grouping of IP segments on other nodes accessing the server candidate nodes in the internal network.

3. The method according to claim 2, wherein the step b comprises:
presenting and analyzing a topological structure of the internal network nodes, using a visualization method of combining chord diagrams and bubble graphs.

4. The method according to claim 3, wherein the step c specifically comprises:
visually analyzing characteristics of different servers from time, functions, and characteristics of traffic flow; and
counting and visualizing access times and uploaded traffic flow of server nodes in different time periods and different protocols according to server nodes selected by users.

5. The method according to claim 4, wherein the step d specifically comprises:
comparing a communication mode of clients with the communication mode of the servers, using a visualization manner of a pie diagram matrix; and
obtaining a protocol specific gravity used by communication traffic flow between clients and clients, clients and servers, servers and servers according to the pie diagram matrix, so that a conventional communication mode of the internal network is obtained.

6. A visual analytical system for a network system structure and a network communication mode, the system comprising a pre-processing module, a network node dividing and analyzing module, a server function category analytical module, and a network communication mode analytical module;
wherein the pre-processing module is configured to pre-process network traffic flow log data;
wherein the network node dividing and analyzing module is configured to divide and analyze network nodes by utilizing a visualization technology according to the pre-processed data, and the network node dividing and analyzing module combines a user interaction to determine server nodes and client nodes in the network nodes;
wherein the server function category analytical module is configured to perform a visual analysis on traffic flow and an access situation of the server nodes to determine a server function category according to the determined server nodes; and
the network communication mode analytical module is configured to present and analyze the network communication mode through the visualization technology according to the determined server nodes, client nodes and the server function category.

7. The system according to claim 6, wherein the pre-processing module is specifically for following purposes:
sorting access times, of each node of an internal network, from network traffic flow logs and sorting total uploaded traffic flow by each node from the network traffic flow logs when internal network nodes are accessed;
respectively selecting nodes ranked higher in access times and nodes ranked higher in total access uploaded traffic flow as server candidate nodes; and
performing an integration and a grouping of IP segments on other nodes accessing the server candidate nodes in the internal network.

8. The system according to claim 7, wherein the network node dividing and analyzing module is configured to present and analyze a topological structure of the internal network nodes by using a visualization method of combining chord diagrams and bubble graphs.

9. The system according to claim 8, the server function category analytical module is specifically for following purposes:
visually analyzing characteristics of different servers from time; functions and characteristics of traffic flow; and
counting and visualizing access times and uploaded traffic flow of server nodes selected by users in different time periods and different protocols according to server nodes selected by users.

10. The system according to claim 9, wherein the network communication mode analytical module is specifically for following purposes:
comparing a communication mode of clients with a communication mode of the servers by using a visualization manner of a pie diagram matrix; and
obtaining a protocol specific gravity used by communication traffic flow between clients and clients, clients and servers, servers and servers according to the pie diagram matrix, so that a conventional communication mode of the internal network is obtained.

* * * * *